United States Patent
Enakiev et al.

(10) Patent No.: US 9,424,678 B1
(45) Date of Patent: Aug. 23, 2016

(54) METHOD FOR TELECONFERENCING USING 3-D AVATAR

(71) Applicant: RUNA CAPITAL, Grand Cayman (KY)

(72) Inventors: Anton Enakiev, Moscow (RU); Alexander G. Tormasov, Moscow (RU); Serguei M. Beloussov, Singapore (SG); Juri V. Tsibrovski, Seattle, WA (US); Stanislav S. Protassov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 160 days.

(21) Appl. No.: 13/968,489

(22) Filed: Aug. 16, 2013

Related U.S. Application Data

(60) Provisional application No. 61/691,284, filed on Aug. 21, 2012.

(51) Int. Cl.
*G06T 13/40* (2011.01)
*H04N 7/15* (2006.01)
*G06T 13/20* (2011.01)

(52) U.S. Cl.
CPC .............. *G06T 13/40* (2013.01); *H04N 7/157* (2013.01); *G06T 13/205* (2013.01)

(58) Field of Classification Search
None
See application file for complete search history.

(56) References Cited

U.S. PATENT DOCUMENTS

| | | | |
|---|---|---|---|
| 8,647,206 B1* | 2/2014 | Gottlieb | 463/40 |
| 2009/0251460 A1* | 10/2009 | Dunnigan | 345/419 |
| 2010/0013828 A1* | 1/2010 | Castelli et al. | 345/418 |
| 2010/0115427 A1* | 5/2010 | Schroeter et al. | 715/757 |
| 2010/0128103 A1* | 5/2010 | Sim | H04N 7/147 348/14.02 |
| 2011/0244961 A1* | 10/2011 | Soelberg | 463/32 |
| 2011/0304629 A1* | 12/2011 | Winchester | 345/473 |
| 2012/0069028 A1* | 3/2012 | Bouguerra | 345/473 |
| 2013/0038510 A1* | 2/2013 | Brin | G02B 27/017 345/8 |

* cited by examiner

*Primary Examiner* — Daniel Hajnik
(74) *Attorney, Agent, or Firm* — Arent Fox LLP; Michael Fainberg

(57) ABSTRACT

A method for implementing teleconferences when at least one participant receives 3-D data. A data rendering device presents data in a 3-D format or in pseudo 3-D format. A 3-D image is formed on a user computer system. The 3-D presentation is calculated by a local computer system. A block of user avatars is formed on the local computer system for all teleconference participants (including a local participant). The participant avatar includes a kinetic model (joints, muscles, body parts, etc.). The avatar includes a participant's behavior model (gestures, fingers, mimics, etc). The avatar also includes an avatar skin. The avatar skin includes a stable (unchangeable) part of the participant containing face and visible body parts, as well as modifiable parts (e.g., clothes, shoes, accessories, etc.).

15 Claims, 4 Drawing Sheets

METHOD FOR TELECONFERENCING USING 3-D AVATAR

CROSS-REFERENCE TO RELATED APPLICATIONS

This application claims priority to Provisional U.S. Patent Application No. 61/691,284, filed on Aug. 21, 2012 incorporated by reference herein in its entirety.

BACKGROUND OF THE INVENTION

1. Field of the Invention

This invention relates to a method, system and computer program product for teleconferencing using 3-D presentation of conference participants.

2. Description of the Related Art

Conference calls and teleconferences have become an order of business for modern enterprises. However, teleconferencing often lacks interpersonal face-to-face communication desired for productive discussions and information exchanges.

Accordingly, a system and method for providing a virtual 3-D presence of some of the teleconference participants is desired.

SUMMARY OF THE INVENTION

Accordingly, the present invention is related to a system, method and computer program product for improving teleconferences where participants of teleconferences are recorded using audio-video recording means and, optionally, other recording and detecting means providing other users and/or computing system with voice, images, biometric data and other real and computed data related to the participants. A transforming input data is provided to control avatars of the participants.

In one embodiment, a method for implementing teleconferences when at least one participant receives 3-D data is provided. According to the exemplary embodiment, a data rendering device can present data in a 3-D format or in pseudo 3-D format (an image is transformed to 3-D when it enters user's eyes—separate images for each eye of the user are generated and transmitted). In this case, the user could not see all "sides" of the 3D model, but still perceives the image as a 3D image or flat images approximated to a 3-D perspective.

The 3-D perspective can be created by a depth perception illusion, by non-linear image transformations or by other artistic means. A 3-D image is formed on a user computer system. The 3-D presentation is calculated by a local computer system. According to the exemplary embodiment, a block of user avatars is formed on the local computer system for all teleconference participants (including a local participant).

The participant's avatar includes a kinetic model (joints, muscles, body parts, etc.), and, optionally, the avatar can include a participant's behavior model (gestures, fingers, mimics, facial expressions, etc.). The avatar also includes an avatar skin. The avatar skin includes a stable (unchangeable) part of the participant containing face and open body parts, as well as modifiable parts (e.g., clothes, shoes, accessories, etc.).

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
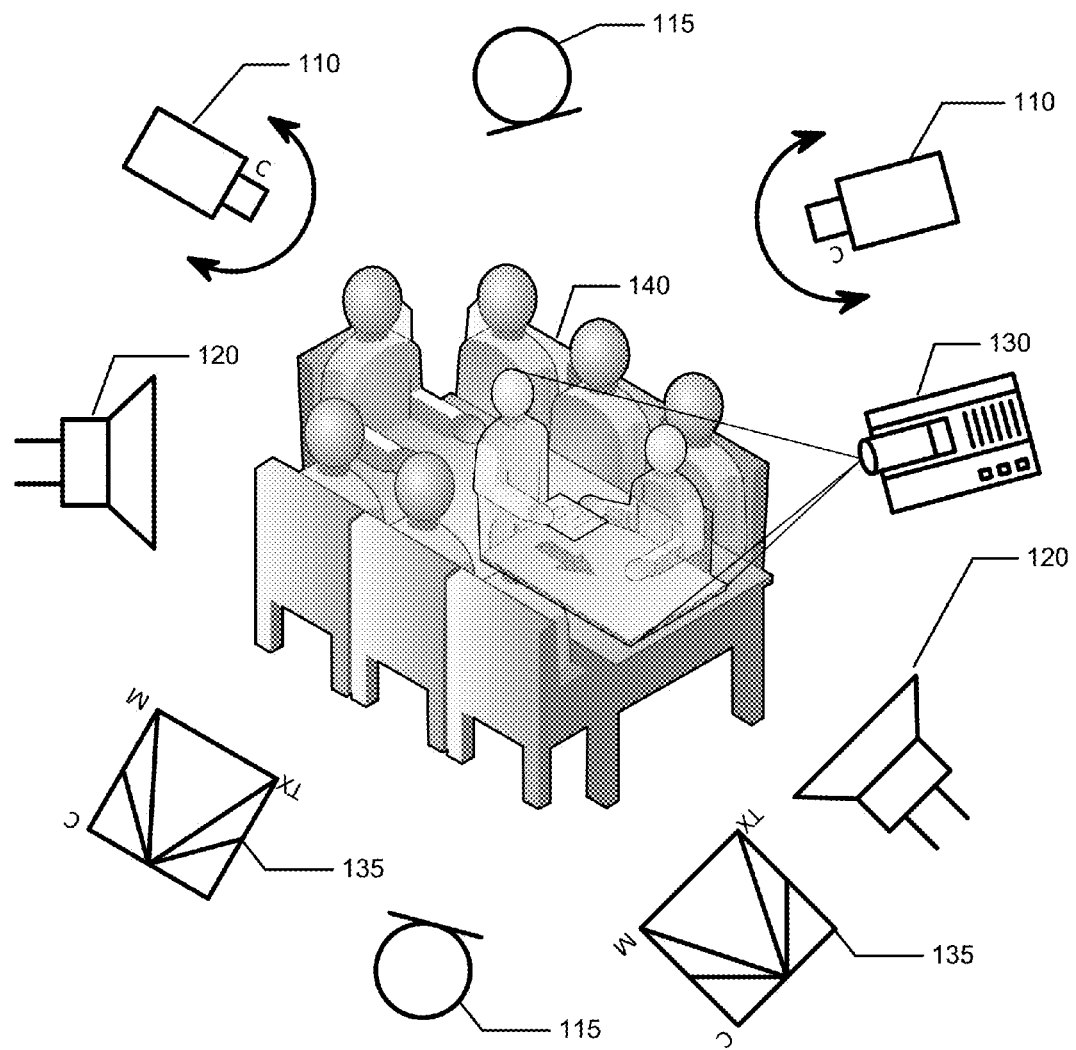
FIG. 1 illustrates an exemplary conference room used for a virtual conference.

Reference will now be made in detail to the preferred embodiments of the present invention, examples of which are illustrated in the accompanying drawings.

In one embodiment a method for implementing teleconferences when at least one participant receives 3-D data is provided. According to the exemplary embodiment, a data rendering device can present data in a 3-D format or in pseudo 3-D format.

The 3-D perspective can be created by a depth perception illusion, by non-linear image transformations, or by other artistic means. This includes, for example, providing the image with a depth of field related to certain light conditions, blurring or fogging of distant objects, distorting closest pictures and other techniques providing a flat picture with a 3D illusion or boosting a 3D effects of 3D graphics.

A 3-D image is formed on a user computer system. The 3-D presentation is calculated by a local computer system. According to the exemplary embodiment, a block of user avatars is formed on the local computer system for all teleconference participants (including a local participant).

The participant's avatar includes a kinetic model (joints, muscles, body parts, etc.), and, optionally, the avatar can include a participant's behavior model (gestures, fingers, mimics, facial expressions, etc.). The avatar also includes an avatar skin. The avatar skin includes a stable (unchangeable) part of the participant containing face and open body parts, as well as modifiable parts (e.g., clothes, shoes, accessories, etc.).

An avatar skin of a local user can be provided to the local system by other users or it can be used on a local system of the local user for a "from a side look." The avatar skin can be modified by the user himself for better recognition. The user avatar skin can be also modified by other local users for better recognition and perception. The avatar skins of other users that are modified locally remain on the local computer. These skins are not sent to remote users in order to avoid confusion.

According to the exemplary embodiment, a kinetic model is employed for emulating participant's movements used for forming a 3-D visual model of the participant. The movements of the real person are scanned. For example, a special 3-D scan of a conference area where the participants are located can be performed. Alternatively, kinetic sensors can be attached to the participants. In another embodiment, special traceable markers attached to the participants' body parts can be used.

According to one exemplary embodiment, sound signals can be used for correction of the kinetic model. For example, sharp or abrupt sounds can indicate abrupt movements. The system can use kinetic model authentication when some movement data is lost during transmission. According to the exemplary embodiment, a UDP protocol is used. In this protocol, the lost data packets (or data blocks) are not re-sent.

According to the exemplary embodiment, the participant's kinetic model can contain minor details reflecting specific mimics and gestures that can be lost during initial scanning. For example, a loud speech can trigger red facial skin or bulging eyes. A loud knock can indicate hitting on a table by the participant. Quiet tone of voice can be connected to the enlarged eye pupils, etc.

According to the exemplary embodiment, the avatar skin can have several versions. For example, the avatar can have a "bad hair day" skin and a "groomed" skin. A supervisor can use particular participant's avatar skin for discipline or exemplary purposes. As such, a participant entering the conference room late can be displayed using a "bad hair day" avatar skin. The avatar skin can be enhanced using modern artistic means used in video games, for example.

According to the exemplary embodiment, a teleconference is presented to the participants in near real-time. Thus, 3-D rendering devices are used. In order to achieve near real-time transmission of 3-D data synchronization needs to be implemented to compensate for computation and transmission delays, as described, for example, in U.S. Patent Application No. 61/665,939 filed on Jun. 29, 2012, incorporated herein by reference. Here, for example, if all participants try to do something without synchronization, different delays can result in a useless scene. For example, handshaking or "secret" handshaking when the second handshaker performs some movements within 1 second after the first one can produce a comic effect.

Furthermore, control data for the avatar may be generated continuously, even if some frames or a group of frames are lost. The avatar's movement and behavior may be interpolated and/or calculated based on data from different sources. For example, if the marker points are unreachable or not visible, the video stream can be used for movement detection. If a simple object, like a ball or a vase, is out of reach of the video camera, the sound of the ball hitting a surface or the sound of breaking the vase can be used for detecting a corresponding location. Common or typical human behavior can be also used for control data generation.

According to the exemplary embodiment, the actual conferencing process is simplified. A minimal amount of data is acquired locally and sent to the remote users. The participants on the local systems are made "alive" by addition of voice, movements, mimics, etc. The remote users receive data in a most realistic way possible.

According to the exemplary embodiment, exchange of graphic data can be implemented using a two-dimensional "white board." The users can write and read the graphic data using the "white board." The "white board" can be also used as a reference in the virtual conference space. Other references can also be used for positioning the conference participants in the virtual conference space.

According to the exemplary embodiment, the 3-D data can be displayed using holograms, virtual reality glasses, 3-D monitors, images composed on steam clouds, etc. The virtual reality glasses and the images composed on steam clouds are preferred. However, stereo displays with the flat virtual touch screens can also be very effective. The 3-D perception can be created on these screens by taking into account user eyes position. In one embodiment, user head tilting can be also considered.

According to one example embodiment, a controlled delay can be used for rendering the 3-D images. In data transmission, maximum reliability is required for sound. The imaging data is important, but not as critical for the teleconferencing. According to the exemplary embodiment, pictures of the participants and the environment are taken periodically and compared against the 3-D models. If significant differences are detected, the 3-D model is corrected.

According to one exemplary embodiment, some physical objects (equipment) can be modeled and the corresponding avatars can be created. Thus, the equipment can be virtually shared among the participants for presentations. All object properties are reflected in the avatar skin and in the kinetic model. For example, a rotation speed of a real football acquired from a high resolution video can be used for modeling the football in the model that has a higher resolution than the original video.

According to one exemplary embodiment, a participant can change the perspective of the virtual conference or select a view where his picture is a part of the overall conference view. The participant can select a transmission delay so his own speech is delayed. Thus, the participant can view his own speech and behavior as it is seen by the other participants.

According to the exemplary embodiment, each participant can use the most favorable lighting (from below, from the side, from the above, etc.) for his facial presentation, which is not possible in the real conference. Data processing optimization techniques can be used within the spirit of the invention. For example, a special codec or codecs adapted to invention requirements can be used in the invention. For real teleconferences, the best possible quality is required. However, in the present case, it is not necessary—rather, the best quality is only needed for important data, for example, the data relating to the avatars. A monochrome motion picture can be used to detect motion details with very good quality. Most cameras provide an option for hardware compression of the images to monochrome, such as black-and-white or sepia. Also, spectrum filtering may be used to improve the picture, for example, an orange or a yellow filter provides a very good contrast. Also, an infrared camera can be used.

Processing of parallel motion pictures of one object from one camera may be used. For example, monochrome with high compression with 100 fps may be used in parallel with best quality picture with 2 fps or so, or even less. The last images are used for updating details. Also, special bits can be reserved for auxiliary data in the codecs. For example, in a color scheme, the pixels with certain bits may indicate precision position of a marker point, which is almost unrecognizable on the normal picture. This may require a special codec.

The techniques described above may be used when a camera can provide hardware compression of images for improving performance and simplifying further calculation of required control data locally on the computer, to which the camera is connected. Alternatively, it may be used when cloud service is used for calculation of the control data. It can drastically improve the quality of the avatars and reduce delays due to the data processing.

FIG. 1 illustrates an exemplary conference room used for a virtual conference. Video cameras 110 generate a video stream used for the initial virtual model. The video cameras 110 also detect movements of the participants 140, lighting and color changes reflecting, for example, participants' skin color and look.

Doppler or similar scanners 135 (ultrasound or laser or similar), such as Kinect, generate 3-D models of the participants and register their movements. The initial video stream is formed in a visual light range and corrected by data acquired by the emissions of different invisible ranges. The directional microphones 115 record audio stream and detect the source of the sound. This data can be used later for 3-D images formation, when a sound source hidden from the video cameras is moved.

Additionally, the audio signals can be used for creation of a sound 3-D model generated based on locations of sound emitting devices (speakers) 120 within the conference room. A virtual reality projector 130 is used for rendering the 3-D images.

Figure 2:
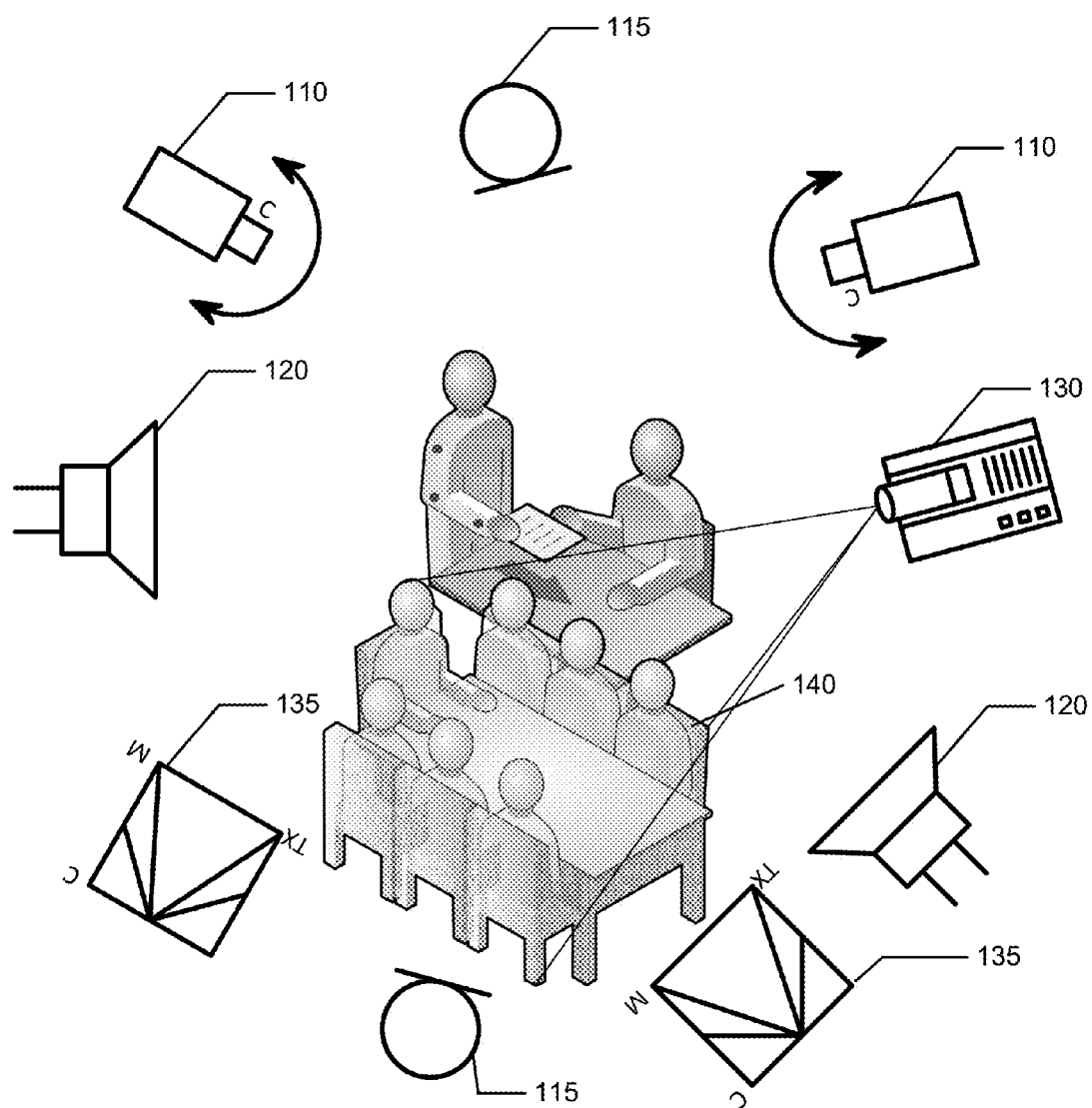
FIG. 2 illustrates a conference room presented from a different angle.

FIG. 2 illustrates the same conference room presented from a different angle. According to the exemplary embodiment, a database contains profile descriptions or sprites of the personal (or object) figures. The database contains shape textures and color textures needed for the 3-D models. The database is periodically updated by comparing virtual images against the real ones. The virtual 3-D images are sent to a special server for comparison.

The users can select objects to be converted into the 3-D models that are used constantly without updates. Unlike complete virtual reality, the users can detect and change the emotional state (or health appearance) for other participants. This can be particularly useful in telemedicine.

According to the exemplary embodiment, movements of the lips and jaws can be emulated using the information about location of sound source received from the microphones and sound itself, since different sounds correspond to different articulation movements. Additional video effects can be implemented based on a spatial sound scene. According to the exemplary embodiment, the video can be created using a high frame rate. For example, data related to static objects can be transmitted using a very high quality, but not very often.

Figure 3:
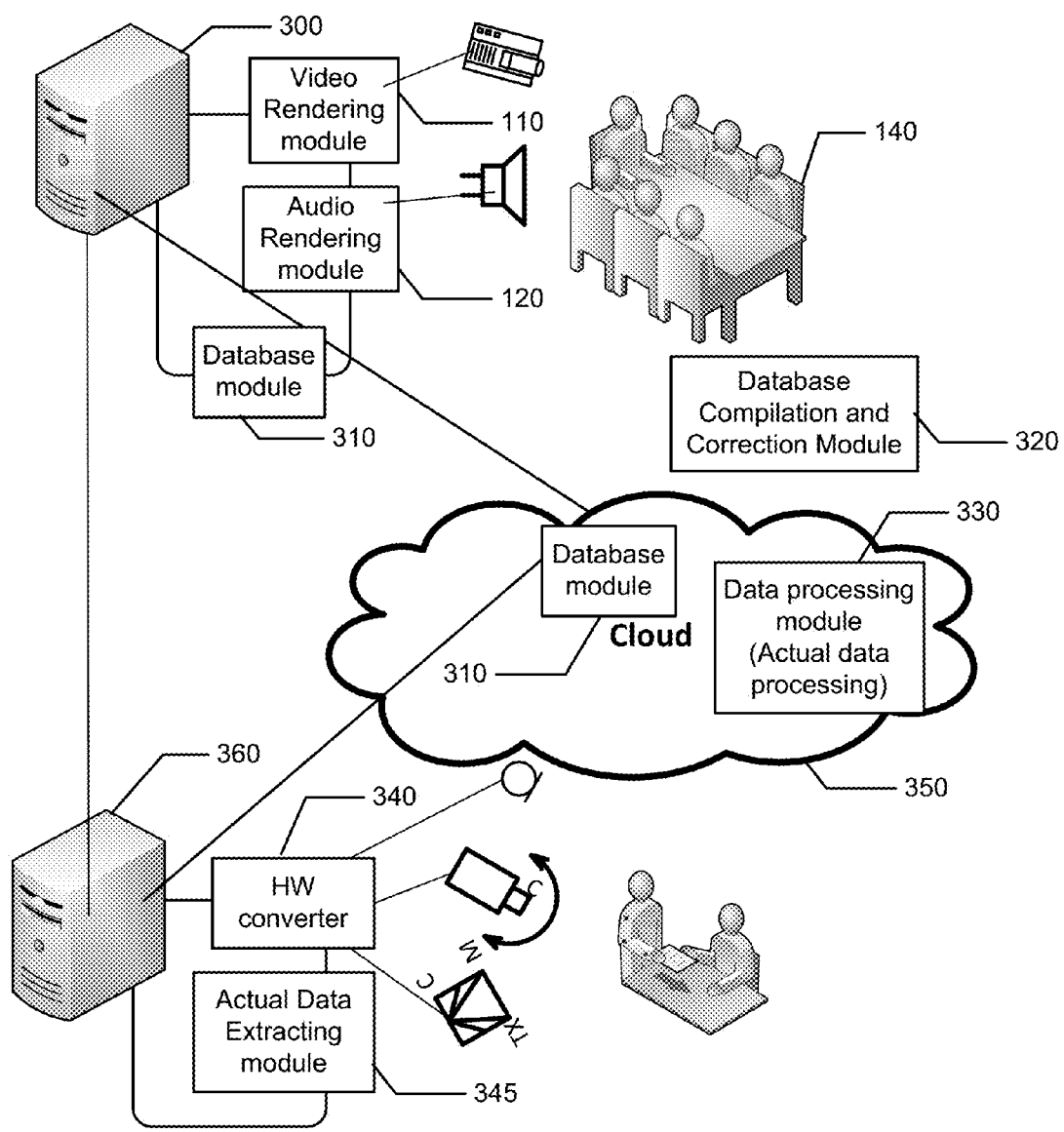
FIG. 3 illustrates system architecture, in accordance with the exemplary embodiment.

FIG. 3 illustrates system architecture. The data related to textures, sprites and graphics needed for modeling is collected by local servers 300. The data can be processed locally, or it can be send to remote powerful servers 360. Then, the database is distributed over the servers of the video conference users.

Note that avatar skins calculations require creation of the spatial model. Then, the real image is projected over the mathematical model and the color texture of the skin is generated. The spatial skin texture is formed by combining the data from the Doppler sensors 135 (see FIG. 1) and the video camera 110. The Doppler sensors 135 provide computational means with 3D shape of the object. (http**// en.wikipedia.org/wiki/3D_scanner). It can be an ultrasonic or a laser scanner that senses surface shapes only.

The data acquired from the video rendering module 110 and from the audio rendering module 120 is stored in a database 310 located locally or on the cloud 350. A database compilation and correction module 320 is a software component, which checks if all the participants have avatars in the database 310. If an avatar is significantly changed or expired, the module 320 acquires data from a real person for the avatar and corrects the avatar-related data.

If a new participant arrives to the conference, the module 320 acquires the data from the participant's photos or videos. In exemplary embodiment, the teleconference can start with the expired or not personalized avatars and, then, the avatars are corrected to match with the real participant or his preferable representation. Note that the participant can use his artificial avatar instead of "close to real" representation.

The module 320 can get the data from a data processing module 330 for processing and updating. According to one exemplary embodiment, the participant can inject the preferred avatar into the database 310 without help of data processing module 330. It one example, the participant can propose different avatars to different places of the same teleconference.

A data processing module 330 is a software/hardware module which acquires the real videos from different places and converts them into avatars using sounds/movements/ color schemes. In one embodiment, the data processing module 330 can be a common module for the teleconference. In another embodiment, the data processing module 330 can be placed on a server, which has the fastest and broadest connection to the certain place of the teleconference. The converted data is compressed and can be transferred over any channel.

A hardware (HW) converter 340 is an optional component. The HW converter 340 has hardware logic computational means used for coding and compressing the video. An actual data extracting module 345 can extract the required data from the video. This data can be participants' movements, scene changing or the like. In another example, the module 345 can remove exceeding portions from the bitmap and the converter 340 can compress less data to improve performance. For example, the module 345 can remove halftones and/or remove the shadows from ceiling where the camera is fixed.

A video camera 110 gives a "flat" picture of the same object. Combining certain flat picture with the 3-D model gives a color model of visible part, i.e., a so called "skin" of the 3-D object. In other words, for each point of 3-D model, the video camera gives certain color bits. Then, the 3-D model can be transformed by a color structure on its surface. The textures can be overlaid by the computational means.

According to the exemplary embodiment, a texture map can be used instead of or as an addition to "textures." A texture map is applied (mapped) to the surface of a shape or polygon. This process is similar to applying patterned paper to a plain white box. According to the exemplary embodiment, some parts of the avatar can have fixed texture mapping, such as a face, and some parts can have modifiable textures, such as hair styling.

According to the exemplary embodiment, a cloud service 350 can be used for the video conferences. The cloud service 350 can process data received in the real time and from the commands for moving the details or objects. These commands do not take up a lot of bandwidth and can make the virtual participant to be more alive. The 3-D modeling can be viewed as a kind of a video compression. The largest share of computational resources requires converting raw data to a light set of commands for 3-D avatars.

If a participant can provide the cloud 350 with a raw data faster than by calculating avatar on his own, the cloud service is useful for boosting image processing speed. Also, a common cloud service can compute images for each user. It may be useful if a certain user does not have acceptable 3-D processing resources and wants to see a flat picture. Such a user has no need for controls and data for 3-D avatars.

According to the exemplary embodiment, the system includes authentication and security means. Thus, the participants can be sure that they conference with the avatars of the real people. For example, authenticated users can be presented in color mode, while others are shown in monochrome.

According to one exemplary embodiment, the identification mechanism can be combined with authentication mechanism using, for example, biometrics (speech samples or iris patterns). The security modules monitor for continuality of user picture during the conference session to detect possible falsifications. If the picture is interrupted, a secondary or simplified identification is performed. For example, speech spectrum from the sound source which location is detected by two or more microphones 115 (see FIG. 1) is analyzed and compared against the image. If a match occurs, the avatar is colored again to indicate its authenticity.

According to the exemplary embodiment, the conference can take place in a real environment, in a "blue room" or in the room with the virtual objects and walls. In case of the "blue room," the procedure identification of objects to be virtualized is simplified by elimination of the blue color from the analysis. The walls can be near 100% sound proof for simplification of sound scene analysis. Walls may absorb sound, e.g., an anechoic chamber, or can pass sound through a light curtain. In case of a real environment or virtual reality environment, the background can be eliminated by calibration of virtual reality rendering means or by the analysis of the real environment.

The calibration is needed because of the differences in the emission rate of different screens. Subsequently, the virtual reality is subtracted from the analysis, similar to reduction of echo from loud speakers during loud telephone conversations. In a "blue room", blue pixels on a picture are treated as totally transparent and the rest part of the picture may be combined with any overlay in a simple manner. Blue pixels are replaced by an overlay and the remainder stays as is, or may be transformed for color or shape to match or coincide with the overlay.

When a real room is used instead, the "blue" pixels of the real room can be detected on the real picture and can be treated as transparent. The task is straightforward when the camera is fixed and angles of camera are known. In this case, a part related to the room is known as well, and the pixels of this part can be considered transparent. Correspondingly, the remainder is related to 3-D shapes of interest to teleconference participants and other objects.

The objective reality requires more complex processing of the images. Certain objects are detected and processed. For example, a video technology can detect lips and lip movements and can start recording upon detection of a smile. According to the exemplary embodiment, the objects can be divided into static (walls and a floor) and dynamic (blinds, TV screens, etc.). The images are analyzed according to the class of the object. The static objects are excluded from the analysis or a constant virtual picture is generated for these objects and a virtual sound echo effect can be added as well.

Figure 4:
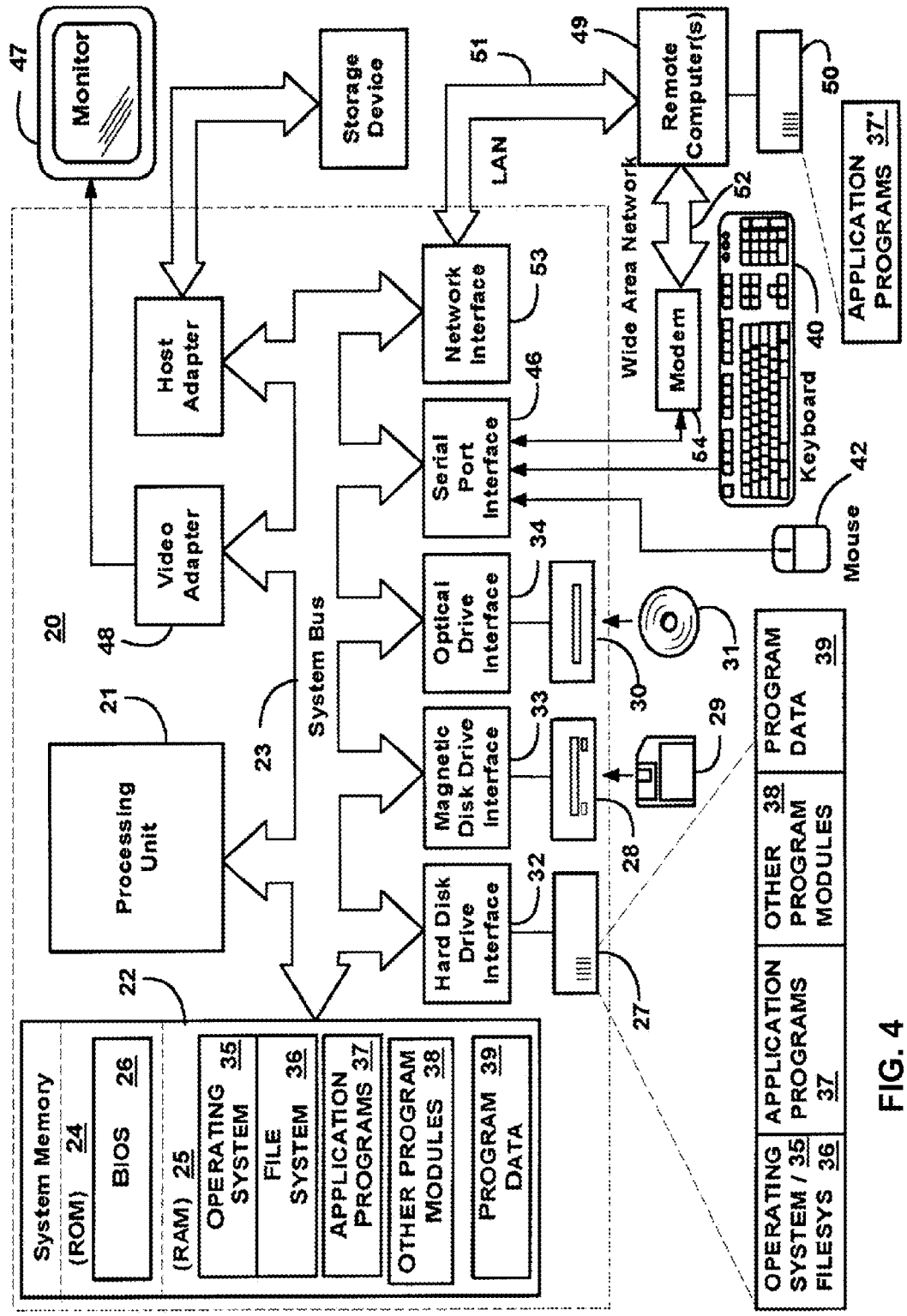
FIG. 4 illustrates an exemplary computer system on which the invention may be implemented.

With reference to FIG. 4, an exemplary system for implementing the invention includes a general purpose computing (or processing) device 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory optionally includes read-only memory (ROM) 24 and random access memory (RAM) 25. A basic input/output system 26 (BIOS), containing the basic routines that help transfer information between elements within the device 20, such as during start-up, is stored in ROM 24.

The computing device 20 can optionally include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein does not employ a hard disk, a removable magnetic disk 29 and a removable optical disk 31, it should be appreciated by those skilled in the art that these devices can also be used in the exemplary operating environment.

A number of program modules may be stored on the hard disk, magnetic disk 29, optical disk 31, ROM 24 or RAM 25, including an operating system 35. The computing device 20 includes a file system 36 associated with or included within the operating system 35, one or more application programs 37, other program modules 38 and program data 39. A user may enter commands and information into the computing device 20 through input devices such as a keyboard 40 and pointing device 42, but these devices are optional. The exemplary embodiment provides a virtual keyboard and a "touch screen" option for pointing.

These and other input devices are often connected to the processing unit 21 through a serial port interface 46 that is coupled to the system bus, but may be connected by other interfaces, such as a parallel port, game port or universal serial bus (USB). A monitor 47 or other type of display device can be optionally connected to the system bus 23 via an interface, such as a video adapter 48. In the exemplary embodiment, an integrated display is used.

The computing device 20 may operate in a networked environment using logical connections to one or more remote computers 49. The remote computer (or computers) 49 may be another computer, a server, a router, a network PC, a peer device or other common network node, and typically includes many or all of the elements described above relative to the device 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the device 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system provides for virtual teleconferencing experience by using 3-D presentations of the participants.

It should also be appreciated that various modifications, adaptations and alternative embodiments thereof may be made within the scope and spirit of the present invention. The invention is further defined by the following claims.

What is claimed is:

1. A system for providing a virtual conference environment using 3-D avatars, the system comprising:
   a plurality of remotely controlled video cameras configured to record image data of conference participants, respectively;
   a plurality of directional microphones configured to record audio data of the conference participants, respectively;
   a plurality of speakers for reproducing the recorded audio data of the conference participants;
   at least one kinetic sensor configured to detect and record movements of at least one of the conference participants, respectively, in a form of a kinetic data;
   a virtual reality projector configured to render 3-D virtual data to the participants, the 3-D virtual data providing the virtual conference environment that includes each of the conference participants illustrated as the 3-D avatars; and
   a computer processor configured to generate the 3-D virtual data by combining the image data with recorded audio data and the kinetic data;
   wherein the 3-D avatars are stored in at least one avatar database and accessed by the computer processor when creating the 3-D virtual data,
   wherein the computer processor is further configured to: (i) extract differential and behavior parameters from the recorded image data for a selected 3-D avatar, (ii) optimize the recorded image data for the selected 3-D avatar for a transmission channel based on capacity and latency of the transmission channel, (iii) transfer the optimized data to a client associated with the selected 3-D avatar based on the capacity and latency, and (iv) apply the differential and behavior parameters to the selected 3-D avatar illustrated in the virtual conference environment to the client associated with the selected 3-D avatar,
   wherein, when at least one additional conference participant attempts to join the virtual conference environment, the computer processor accesses the at least one avatar database to identify a 3-D avatar associated with the at least one additional conference participant, and
   wherein, if the at least one avatar database does not have the 3-D avatar associated with the at least one additional conference participant, the computer processor is configured to access a photograph or video of the at least one additional conference participant from a source other than the at least one avatar database and generate the 3-D avatar associated with the at least one additional conference participant that is displayed in the virtual conference environment.

2. The system of claim 1, wherein the avatar database is located in a cloud.

3. The system of claim 1 further comprising at least one Doppler sensor configured to acquire the kinetic data.

4. The system of claim 1, wherein the kinetic data is acquired using traceable markers attached to body parts of the conference participants.

5. The system of claim 1, wherein the 3-D avatars are provided to remote server over a cloud.

6. The system of claim 1, wherein the 3-D avatars are displayed using at least one of:
   a hologram;
   virtual reality glasses;
   a 3-D monitor; and
   steam cloud images.

7. A method for providing a virtual conference environment using 3-D avatars, the method comprising:
   capturing, by a plurality of remotely controlled video cameras, a video data of conference participants, respectively;
   capturing, by a plurality of directional microphones, audio data of the conference participants, respectively;
   detecting and recording, by at least one kinetic sensor, movements of at least one of the conference participants, respectively, as kinetic data;
   generating 3-D virtual data by combining the captured video data with the captured audio data and with the recorded kinetic data;
   rendering, by a virtual reality projector, the 3-D virtual data providing the virtual conference environment including each of the conference participants illustrated as the 3-D avatars;
   storing the 3-D avatars in at least one avatar database;
   extracting differential and behavior parameters from the captured data for a selected 3-D avatar;
   optimizing the captured data for the selected avatar for a transmission channel based on capacity and latency of the transmission channel;
   transferring the optimized data to a client based on the capacity and latency;
   applying the differential and behavior parameters to the avatar illustrated in the virtual conference environment to the client;
   when at least one additional conference participant attempts to join the virtual conference environment, accessing the at least one avatar database to identify a 3-D avatar associated with the at least one additional conference participant;
   if the at least one avatar database does not have the 3-D avatar associated with the at least one additional conference participant, accessing a photograph or video of the at least one additional conference participant from a source other than the at least one avatar database; and
   generating the 3-D avatar associated with the at least one additional conference participant that is displayed in the virtual conference environment.

8. The method of claim 7, further comprising adding a skin to the 3-D avatars.

9. The method of claim 7, further comprising masking lags in data transmission through the channel by applying behavior patterns.

10. The method of claim 9, wherein the behavior patterns are predefined and calculated during teleconference to avoid artifacts.

11. The method of claim 9, wherein the behavior patterns are extracted from prior data transmission translation and applied to any combination of micro-movement of parts of the 3-D avatar.

12. The method of claim 11, wherein the behavior patterns are applied to unintended gestures and movements to keep the 3-D avatar's appearance live.

13. The method of claim 7, further comprising comparing current images of the participants with the 3-D avatars and correcting the avatars if the differences are detected.

14. The method of claim 7 further comprising generating artificial intelligence models for the 3-D avatars.

15. The method of claim 7, further comprising authenticating the 3-D avatars and changing an appearance of the 3-D avatars based on a successful authentication.

\* \* \* \* \*